No. 778,610.

Patented December 27, 1904.

UNITED STATES PATENT OFFICE.

KARL SCHIRMACHER, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

BLACK DISAZO DYE AND PROCESS OF MAKING SAME.

SPECIFICATION forming part of Letters Patent No. 778,610, dated December 27, 1904.

Application filed July 30, 1904. Serial No. 218,891. (Specimens.)

*To all whom it may concern:*

Be it known that I, KARL SCHIRMACHER, Ph. D., chemist, a citizen of the Empire of Germany, residing at Höchst-on-the-Main, Germany, have invented certain new and useful Improvements in Black Disazo Dyes and Processes of Making Same, of which the following is a specification.

A meta-phenylenediamindisulfonic acid is described in the German Letters Patent No. 78,834. There it is said that it may be diazotized and tetrazotized; but it is not mentioned in which manner. I have found that only under certain conditions said meta-phenylenediamindisulfonic acid can be tetrazotized without simultaneously producing a vesuvin coloring-matter, and the resulting product is not, as might be expected, the tetrazobenzoldisulfonic acid corresponding to the phenylenediamindisulfonic acid, but a new tetrazophenosulfonic acid. In order to avoid the formation of the vesuvin dyestuff and in order to get a good yield of the tetrazophenosulfonic acid, a larger quantity of nitrite is used than is required for normal tetrazotizing.

By the combination of the new tetrazophenolsulfonic acid with beta-naphthol a disazo dye is produced which dyes wool a red-brown shade. The latter is converted into a fast black by a subsequent treatment with chromates.

The process may be carried out, for instance, as follows: 26.8 kilos of meta-phenylenediamindisulfonic acid are dissolved in water to a solution of four to five per cent. with 10.7 kilos of soda, and seventeen kilos of nitrite are added. This solution is slowly introduced at ordinary temperature below the surface of a mixture of eighty kilos of hydrochloric acid of 20° Baumé specific gravity and four hundred liters of water. The solution at first of a light-yellow appearance becomes slightly darker toward the end of the introduction and the tetrazophenolsulfonic acid separates as small yellow crystals. Partly it remains dissolved. After one hour's stirring the transformation is finished. The tetrazophenolsulfonic acid obtained from 26.8 kilos of meta-phenylenediamindisulfonic acid is gradually run into a solution of 20° centigrade of 29.2 kilos of beta-naphthol, eighty kilos of caustic-soda lye of 40° specific gravity, and thirty kilos of sodium carbonate. After some time the mixture is slowly heated to 40° to 60° centigrade, and this temperature is maintained for from three to four hours. The dyestuff separates. To filter it easily, common salt is added. When cold, it is filtered and washed with a solution of common salt. When dry, the dyestuff is a dark powder of bronze luster, soluble in hot water to a bluish-violet color. On addition of much water it turns to red in consequence of dissociation. It also turns to red on addition of acid and brownish-red flakes separate. The dyestuff dyes wool a brownish-red shade which becomes black on subsequent treatment with chromates.

Having now described my invention, what I claim is—

1. The process of producing a black disazo dyestuff which consists in tetrazotizing the known sulfonic acid of meta-phenylenediamin with an excess of nitrite and then combining the thus-formed tetrazophenolsulfonic acid with beta-naphthol.

2. As a new product the disazo dye obtained by combining the tetrazophenolsulfonic acid resulting from meta-phenylenediamindisulfonic acid with beta-naphthol; the dyestuff is a dark powder of bronze luster, soluble in hot water to a bluish-violet color, on addition of acid this color turns to red and brownish-red flakes are separated; it directly dyes wool a red-brown shade which becomes black on subsequent treatment with chromates.

In testimony that I claim the foregoing as my invention I have signed my name in presence of two subscribing witnesses.

KARL SCHIRMACHER.

Witnesses:
 JOHANN HARKENSTEIN,
 BERNHARD LEYDECKER.